US012332604B2

(12) United States Patent
Kissling et al.

(10) Patent No.: US 12,332,604 B2
(45) Date of Patent: Jun. 17, 2025

(54) WATER-RESISTANT WATCH CASE

(71) Applicant: Omega SA, Biel/Bienne (CH)

(72) Inventors: Gregory Kissling, La Neuveville (CH); Cédric Kaltenrieder-Ellis, Courtelary (CH); Nicolas Lazzari, Bienne (CH); Gilles Derriey, Morteau (FR); Jérôme Viprey, Guyans-Vennes (FR); Yves Winkler, Schmitten (CH); Baptiste Hinaux, Lausanne (CH)

(73) Assignee: Omega SA, Biel/Bienne (CH)

( * ) Notice: Subject to any disclaimer, the term of this patent is extended or adjusted under 35 U.S.C. 154(b) by 355 days.

(21) Appl. No.: 18/050,768

(22) Filed: Oct. 28, 2022

(65) Prior Publication Data

US 2023/0195041 A1 Jun. 22, 2023

(30) Foreign Application Priority Data

Dec. 16, 2021 (EP) .................................... 21215150

(51) Int. Cl.
*G04B 39/02* (2006.01)
*G04B 37/10* (2006.01)
*G04B 37/11* (2006.01)

(52) U.S. Cl.
CPC ............. *G04B 39/02* (2013.01); *G04B 37/10* (2013.01); *G04B 37/11* (2013.01)

(58) Field of Classification Search
CPC ................................ G04B 39/02; G04B 37/10
See application file for complete search history.

(56) References Cited

U.S. PATENT DOCUMENTS 3,640,065 A * 2/1972 Lederrey ................ G04B 39/02 368/292
4,668,101 A * 5/1987 Wuthrich ............... G04B 39/02 368/294

(Continued)

FOREIGN PATENT DOCUMENTS

CH 217284 A 10/1941
CH 220798 A 4/1942

(Continued)

OTHER PUBLICATIONS

Chinese Office Action, including Supplemental Search Report, issued Mar. 25, 2024 in corresponding Chinese Patent Application No. 202211614932.6, 6 pages.

(Continued)

*Primary Examiner* — Edwin A. Leon
*Assistant Examiner* — Jason M Collins
(74) *Attorney, Agent, or Firm* — Oblon, McClelland, Maier & Neustadt, L.L.P.

(57) ABSTRACT

The water-resistant watch case includes at least one crystal mounted on an upper side of a middle, a fastening gasket positioned between an upper annular inner wall of the middle and an upper annular outer wall of the crystal. The crystal includes an annular peripheral surface below the upper annular outer wall inclined at an angle smaller than 90° in relation to an axis perpendicular to a plane of the watch case. The peripheral surface comes into contact against an annular inner surface of the middle inclined at an angle similar to the inclination of the annular peripheral surface and below the upper annular inner wall of the middle. The annular peripheral surface and/or the annular inner surface of the middle includes a domed contact portion for a contact on an annular contact line between the two surfaces.

21 Claims, 6 Drawing Sheets

(56) References Cited

U.S. PATENT DOCUMENTS

| | | | | |
|---|---|---|---|---|
| 6,206,563 | B1 * | 3/2001 | Dombre | G04B 39/02 368/294 |
| 11,169,488 | B2 * | 11/2021 | Kaltenrieder | G04B 37/084 |
| 11,449,010 | B2 * | 9/2022 | Kaltenrieder | G04B 39/02 |
| 11,768,469 | B2 * | 9/2023 | Kaltenrieder | G04B 37/084 368/291 |

FOREIGN PATENT DOCUMENTS

| | | | |
|---|---|---|---|
| CH | 249165 | A | 6/1947 |
| CH | 250111 | A | 8/1947 |
| CH | 251697 | A | 11/1947 |
| CH | 378792 | A | 11/1963 |
| CH | 393 196 | A | 2/1965 |
| CH | 399 334 | A | 5/1965 |
| CN | 107850872 | A | 3/2018 |
| CN | 209343141 | U | 9/2019 |
| CN | 111913385 | A | 11/2020 |
| CN | 214474455 | U | 10/2021 |
| JP | 53-15339 | Y1 | 4/1978 |
| JP | 2016-70677 | A | 5/2016 |

OTHER PUBLICATIONS

European Search Report Issued May 20, 2022 in European Application 21215150.0 filed on Dec. 16, 2021 (with English Translation of Categories of Cited Documents), 3 pages.

* cited by examiner

WATER-RESISTANT WATCH CASE

CROSS-REFERENCE TO RELATED APPLICATION

This application claims priority to European Patent Application No. 21215150.0 filed on Dec. 16, 2021, the entire disclosure of which is hereby incorporated herein by reference.

TECHNICAL FIELD OF THE INVENTION

The present invention relates to a water-resistant watch case particularly for a diving watch.

TECHNOLOGICAL BACKGROUND

To provide for the use of a mechanical or electronic watch underwater, the watch case, which comprises a horological movement or a time-based horological module, must be sealingly closed. For this, the watch case comprises a back sealingly fastened to a first side of a middle and a crystal fastened to a second opposite side of the middle. Packings are provided for the assembly of the back, of the middle and of the crystal of the watch. An organ for controlling or setting the functions of the watch is also sealingly mounted through the middle of the case in rest position.

Generally watch cases are not configured or assembled to withstand high water pressures for example during a dive given that the pressure inside the watch case is close to atmospheric pressure. Simple packings of traditional watches are not enough to guarantee good water-resistance of the case during a dive to very large depths underwater.

Mention may be made of the patent application CH 690 870 A5 that describes a water-resistant watch case. The watch case consists of a crystal fastened on an upper side to a middle-bezel and of a back fastened to the middle by screwing it to an inner tapping of the middle. The crystal is fastened to the middle by an annular packing of toroidal shape and bearing on a middle rim. A packing is also provided between an outer rim of the back and a lower surface of the middle of toroidal shape. As the tapping can be damaged at high water pressure, a dome made of resistant metal is also provided bearing against an inner surface of the back and against an inner edge of the middle. However even with such a watch case arrangement, this does not make it possible to guarantee good water-resistance of the case during a dive to very large depths underwater, particularly below 4000 m of depth (fracture zone), which constitutes a drawback.

The patent CH 372 606 describes a water-resistant watch case, which has a central portion or middle surrounding a back and closed by a crystal. A threaded ring is bearing against an inclined outer surface of the back to retain it, and is screwed to a fastening portion connected to the middle. With such an arrangement presented, this does not make it possible to guarantee good water-resistance of the case during a dive to very large depths underwater, particularly below 4000 m of depth (fracture zone), which constitutes a drawback.

The patent CH 378 792 describes a water-resistant watch case. The crystal is a disc of transparent mineral material (glass, crystal). A soft or malleable metal (gold, platinum, silver, copper, tin) packing is driven on the periphery of the crystal against an upper edge. This crystal and packing assembly is driven in a cylindrical bore of a support, such as a middle. The diameter of the cylindrical bore is slightly smaller than the external diameter of the soft metal packing to ensure good water-resistance during the driving of the assembly into the cylindrical bore. The crystal comprises a conical bearing surface on an inner side to come into direct contact against a complementary conical bearing surface of the middle. One drawback of such a contact between crystal and middle is that it is difficult to ensure a good direct contact between the two conical surfaces, because there is a risk of not having the same geometry and thus may have an impact on the mechanical strength of the assembly. In addition, even if the soft metal packing may ensure a good water-resistance, its main drawback is that it must be changed every time the watch case is opened and by principle, it is preferred to use a material that is resistant to the outside environment.

SUMMARY OF THE INVENTION

Therefore, the main aim of the invention is to overcome the drawbacks of the prior art described above by proposing a water-resistant watch case adapted to withstand the high water pressures for a dive to large depths underwater.

To this end, the present invention relates to a water-resistant watch case, which comprises the features of independent claims 1 to 3.

Particular embodiments of a water-resistant watch case are defined in dependent claims 4 to 21.

One advantage of the present invention lies in the fact that a direct contact is produced between the crystal and the middle on an annular contact line preferably in centred position below a fastening gasket of the crystal in the top portion of the middle, which is seen from the centre of the watch case in the direction of the crystal. The fastening gasket is disposed between an upper annular inner wall of the middle and an upper annular outer wall of the crystal.

Advantageously, the crystal comprises an annular peripheral surface that is inclined at an angle smaller than 90° in relation to an axis perpendicular to a plane of the watch case. The annular peripheral surface comprises a domed contact surface portion with a convex curvature having a first radius to contact an annular inner surface of the middle of inclination substantially equal to the inclination of the annular peripheral surface. The contact between the two surfaces defines an annular contact line.

Preferably, the annular inner surface is a surface inclined at an angle similar to the angle of inclination of the annular peripheral surface, but of regular slope without variation of the profile of the surface in the direction of the centre of the watch case. Thanks to that, the direct contact between the two inclined surfaces is well centred.

During the increase of the pressure on the watch, the crystal undergoes a force directed towards the inside of the watch. Given the bearing against the middle, the consequences are a bending of the centre and a slight rotation of the outer walls (cylindrical and conical) of the crystal.

Due to the domed geometry described above, the crystal-middle contact area moves downward of generally conical surfaces at the domed contact surface portion as the pressure increases. The latter also causes an increase of the stress in the contact area which, by elastic deformation of the materials, increases the crystal-middle bearing surface and therefore reduces the local stresses in the middle and the crystal. This contributes to advantageously reducing the risks of breakage by compression of the crystal.

According to the prior art, it is provided to perform a direct contact between two precisely machined surfaces of equivalent shape, for example an annular peripheral surface of conical shape in contact with an annular inner surface of complementary conical shape. With such surfaces of conical shape, the direct contact may be located in the bottom portion or in the top portion of each surface, which may damage the crystal or the middle.

From the water-resistance point of view, there is first of all at the system for assembling the crystal on the middle by means of the gasket, and on the other hand the water-resistance created by the crystal if the latter breaks. In the case of the water-resistance by the crystal if the latter breaks, it can be considered that the system is no longer water-resistant or at least that the watch is no longer usable. In the case where the crystal is connected to the middle by means of the polymer gasket, the geometry of the middle-crystal support has a direct impact on the water-resistance relating to the mechanical strength under pressure of the crystal.

Advantageously, the domed contact surface portion may be located on the annular inner surface of the middle, whereas the annular peripheral surface of the crystal has an inclination with regular slope in the direction of the centre of the watch case. The contact of the two surfaces also takes place in a well centred manner. In addition in another variant, each surface comprises its own domed contact surface portion in order to establish a direct contact with the other surface on a contact line also well centred.

Advantageously, the watch case may take the shape of a cylinder, of an elliptical cylinder, parallelepiped or be in the form of a prism or other forms adaptable to a watch worn on the wrist of a person.

In the case of a parallelepiped at least four vertical flat walls are provided and disposed one after another in the shape of a ring. This means that the annular peripheral surface of the crystal, as well as the annular inner surface of the middle each comprise a set of walls inclined in the direction of the centre of the watch case and connected one after another forming a ring. In addition, domed portions are produced on walls of one of the surfaces, whereas the other surface consists of flat plates inclined in the direction of the centre of the watch case and with a regular slope therefore without variation of the profile of the inclined surface. It may be provided roundings at each wall connection of each inclined surfaces.

In addition, all of the plates of the two surfaces of substantially complementary shape may comprise domed portions to come into contact against one another according to an annular contact line in centred position of the surfaces.

BRIEF DESCRIPTION OF THE FIGURES

The aims, advantages and features of a water-resistant watch case will become more apparent in the following non-limiting description with regard to the drawings wherein.

DETAILED DESCRIPTION OF THE INVENTION

In the following description, all of the components of a water-resistant watch case particularly of a diving watch, which are well known to the person skilled in the art in this technical field are only stated in a simplified manner. The location of the elements of the watch case is given in the direction from the centre of the watch case to the crystal.

Figure 1A:
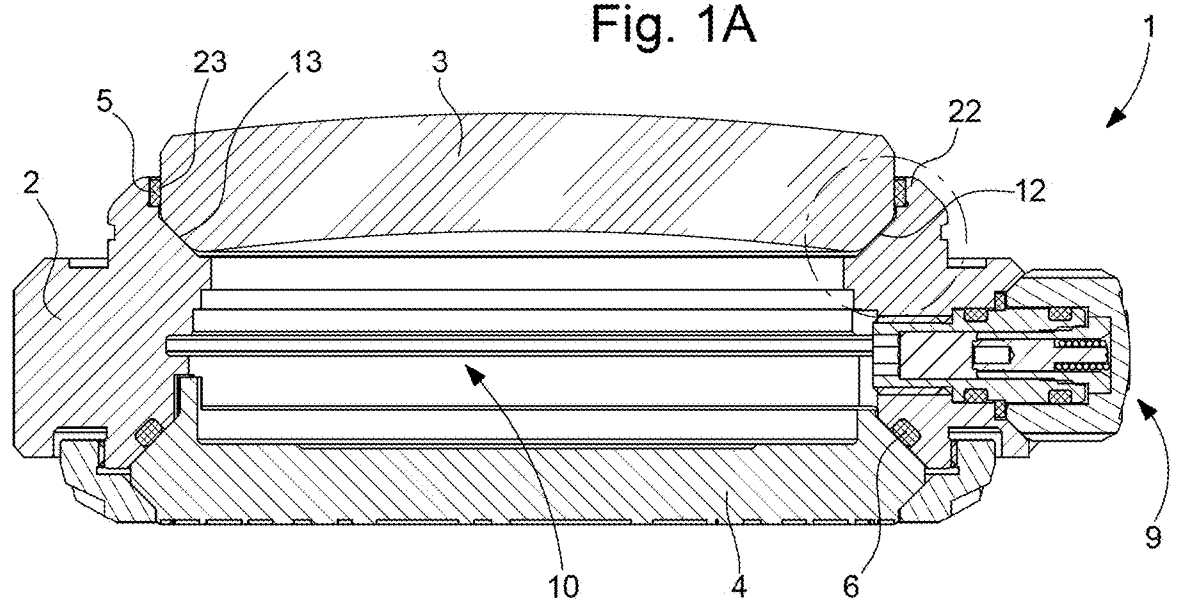
FIGS. 1*a* to 1*c* show in a simplified manner a cross-section of a first embodiment of a water-resistant watch case according to the invention, and a partial detail section of the placement and of the fastening of the crystal to the middle according to the invention, and a partial detail section before fastening the crystal to the middle according to the invention.
Figure 1B:
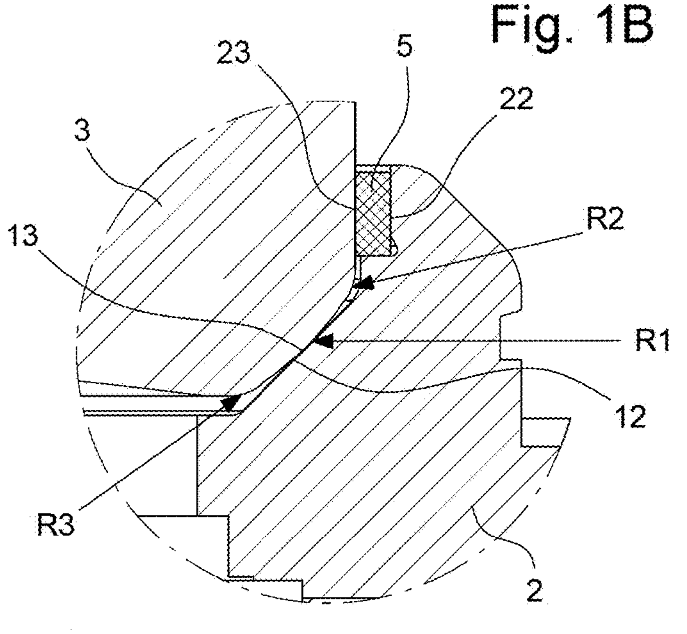
Figure 1C:
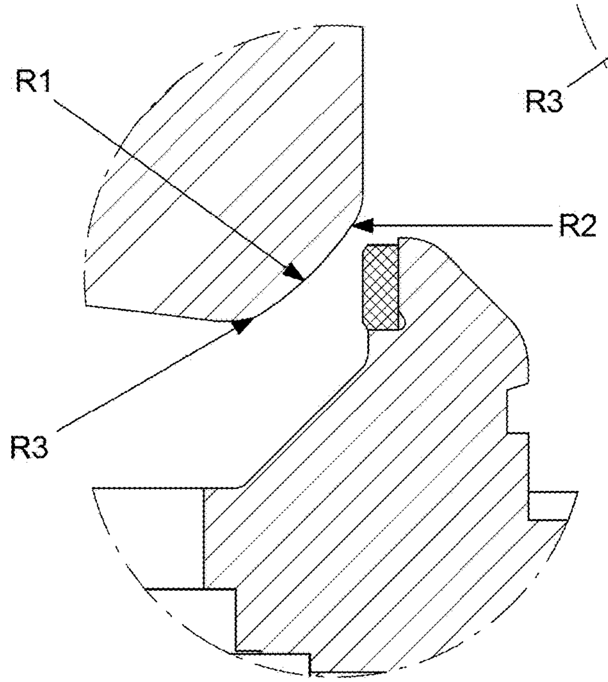

FIGS. 1*a* to 1*c* show a first embodiment of a watch case 1, which may be used for a diving watch. The watch case 1 essentially comprises a crystal 3, which may be made of sapphire or of mineral glass, fastened on an upper side of a middle 2 by means of a fastening gasket 5, and optionally a back 4 mounted on a lower side of the middle 2. A horological movement or module 10 may be disposed in the watch case 1 in a position indicated by the reference 10. At least one control organ 9, such as an arbor-crown, may be sealingly mounted in rest position on or through the middle 2 for setting the time, the date or other functions of the diving watch.

For fastening the crystal 3 on the upper side of the middle 2, the annular fastening gasket 5 is disposed between an annular inner wall 22 of the middle 2 and an annular outer wall 23 of the crystal 3. A back 4 may be provided and sealingly fastened on a bottom portion of the middle 2 by means of an annular packing 6 of toroidal shape placed preferably in a groove 16 of the bottom portion of the middle 2 for its holding in position. An annular bearing surface 24 of the back 4 comes into contact with an annular inner surface 32 of the middle 2 of shape complementary to the bearing surface 24 during the mounting of the back 4 on the middle 2. The bearing 24 and inner surfaces 32 are inclined at a determined angle in relation to an axis perpendicular to a plane of the watch case 1.

In the case of a middle 2 of generally cylindrical shape, the surfaces 24, 32 may be of conical shape and inclined from the outside towards the inside of the watch case 1 at a determined angle in relation to a central axis of the watch case 1. This means that the tip of each cone shape is in the direction of the inside of the watch case 1. For a middle 2 and a back 4 made of a material, such as titanium or of a determined type of steel, the angle may be in the order of 43°±5° in relation to the central axis.

Generally, the material used preferably for the middle 2 must be a material having a high mechanical strength or a high elastic limit, that is to say higher than 500 MPa. In addition, as there is a direct contact with the crystal 3, the friction between the two surfaces must be significantly reduced if possible. The middle 2 may be made for example of stainless steel with high nitrogen content or of grade 5 titanium (Ti6Al4V). By way of comparison, standard stainless steel has an elastic limit between 200 and 250 MPa and a Young's modulus between 180 and 210 GPa, whereas the stainless steel with high nitrogen content has an elastic limit between 500 and 700 MPa and a Young's modulus between 180 and 210 GPa. Grade 5 titanium has an elastic limit between 800 and 900 MPa and a Young's modulus between 105 and 115 GPa.

For any shape of watch case, the crystal 3 comprises an annular peripheral surface 13 below the upper annular outer wall 23, configured to come into direct contact against an annular inner surface 12 below the upper annular inner wall 22 of the middle 2. The annular peripheral surface 13 of the crystal 3 is inclined at a defined angle smaller than 90° in relation to an axis perpendicular to a plane of the watch case 1. Preferably, the annular inner surface 12 is inclined generally from the outside towards the inside of the watch case 1 at the same angle as the annular peripheral surface 13 in relation to a central axis. But the annular inner surface 12 of the middle 2 is inclined with a regular slope in the direction of the centre of the watch case.

If the middle 2 is of generally cylindrical shape, the annular inner surface 12 may be of conical shape and inclined at a defined angle from the outside towards the inside of the watch case 1 with a regular slope without variation of profile of the surface. This means that the tip of the cone shape is in the direction of the inside of the watch case 1. The defined angle of inclination of the surface 12 may be in the order of 43°±5° in relation to the central axis. The annular peripheral surface 13, which may be of shape substantially complementary to the annular inner surface 12 may comprise a domed contact portion with a convex curvature of a first radius R1 defined for a contact on a circular annular contact line against the annular inner surface 12 of the middle 2 of substantially conical shape inclined in the direction of the centre of the watch case. This circular annular contact line is preferably at mid-height of the annular peripheral surface 13, that is to say in a centred position. The first radius R1 may be chosen in the order of 10.7 mm±5 mm. This gives a domed portion in the order of 0.03 mm of thickness on the surface 13, which is enough to establish a contact with the other surface 12 in a well centred manner.

In this case presented, the convex curvature means a domed portion on the annular peripheral surface 13 that must come into direct contact with the annular inner surface 12. The domed portion is in an annular shape. With a concave curvature, this means a hollow portion on the annular peripheral surface 13, which is not able to come to contact the annular inner surface 12 on a circular annular contact line. The convex curvature is therefore chosen on the annular peripheral surface 13, which is desired.

For purely illustrative purposes, it is presented in FIGS. **4*a* to 4*d* various simplified shapes of middle 2 seen from above on the dial side. The external shape of the middle 2 may be different from the internal shape of the middle 2**.

In FIG. **4*a*, the middle 2 is of generally cylindrical shape on the outside and on the inside, the annular inner wall 22 is of cylindrical shape, whereas the inclined annular inner surface 12** is of generally conical shape.

In FIG. **4*b*, the middle 2 is of generally cylindrical shape on the outside, and on the inside, at least four vertical flat walls 22 are provided and disposed one after another in the shape of a ring, whereas the annular inner surface 12** comprises four generally flat plates joined one after another and inclined in the direction of the centre of the watch case.

In FIG. **4*c*, the middle 2 is of generally parallelepiped shape with four sides on the outside and on the inside, the annular inner wall 22 is of cylindrical shape, whereas the inclined annular inner surface 12** is of generally conical shape.

In FIG. **4*d*, the middle 2 is of generally parallelepiped shape with four sides on the outside and on the inside, at least four vertical flat walls 22 are provided and disposed one after another in the shape of a ring, whereas the annular inner surface 12** comprises four generally flat plates joined one after another and inclined in the direction of the centre of the watch case.

It should be noted, that a shape different from the cylindrical shape of the watch case 1 may also be envisaged for example of generally elliptical cylindrical or parallelepiped shape or in the form of a prism with more than four vertical walls. The middle 2 may also have another shape as specified above for the watch case 1, as the middle 2 forms most of the watch case 1. In this scenario, the annular inner surface 12 may consist of at least three or four generally flat walls connected to one another in an annular shape. Each flat wall is inclined from the outside towards the inside of the watch case at a defined angle smaller than 90° in the direction of the centre of the watch case 1 with a slope, which may be regular without variation of profile of the surface. For the annular peripheral surface 13, a plurality of domed contact portions are produced on all of the at least three or four walls connected to one another for a contact on an annular contact line against the annular inner surface 12. It may also be provided roundings at each wall connection of each inclined surface by holding the domed portion even in the roundings, not shown in the figures.

By way of comparison and due to the manufacturing tolerances in the case of a watch case of cylindrical shape as shown in FIGS. **1*a* to 1*c*, 2*a* to 2*c* and 3*a* to 3*c*, a cone-on-cone bearing is rarely perfect. The contact point between the two conical surfaces thus has a tendency to rather be located towards the bottom portion or the top portion of each surface. The FEM simulations carried out show that having a domed contact surface portion with curvature of radius R1 of the surface 13 for the crystal 3 or R1' of the surface 12 for the middle 2** is beneficial in all cases, and especially in comparison with a perfect cone-on-cone bearing as shown in the tables attached.

It is also provided for that a top portion of the annular peripheral surface 13 of the crystal 3 comprises a convex curvature of a second radius R2 in connection with the upper annular outer wall 23 of the crystal 3, and preferably after the convex curvature of first radius R1. The second radius R2 is smaller than the first radius R1 of convex curvature of the domed portions for the contact of surfaces 12 and 13. Preferably, the second radius R2 is of value more than 10 times smaller than the first radius R1, for example at 0.75 mm±0.2 mm. the curvature of radius R2 of the top portion of the annular peripheral surface 13 of the crystal 3 makes it possible to facilitate the mounting of the crystal 3 on the middle 2 by means of the fastening gasket 5. This fastening gasket 5 may be made of polyurethane or even of cross-linked polyurethane and be of annular shape for example of thickness in the order of 0.65 mm±0.2 mm and of height in the order of 2.5 mm±0.5 mm.

It should also be noted that the annular peripheral surface 13 of the crystal 3 may comprise on the side of the bottom portion a convex curvature of a third radius R3 to avoid having too sharp an edge to avoid any contact with a flat part of the bottom portion of the annular inner surface 12 of the middle 2. The flat may be at a distance of almost 3 mm from the crystal 3. The third radius R3 is smaller than or preferably equal to the second radius R2. The curvature at third radius R3, which is preferably after the convex curvature of first radius R1, also makes it possible to avoid risks of chipping the crystal 3.

To produce the crystal 3 in sapphire, a method named Czochralski or EFG (Edge Defined Film Fed Growth) may be used. The domed portion(s) may be obtained by machining or termination method. The method for machining the middle 2 is stamping and the inside is profile-turned, as well as for the domed portion. The friction coefficient is mainly determined according to the domed portion(s) produced in combination with the surface roughness of the middle 2 and of the crystal 3. The friction coefficient may be reduced according to the surface condition, that is to say the roughness of the two portions in contact.

The first three tables below relate on the one hand to the tensile stress at the centre, and on the other hand to the stress on the crystal side, and the stress on the middle side with a variation of inclination of +0.5° and of −0.5° depending on the friction coefficient between the crystal and the middle:

At 750 bars Tensile stress, centre (MPa)

| Friction coeff. | A1 | B1 | C1 | A2 | B2 | C2 | A3 | B3 | C3 |
|---|---|---|---|---|---|---|---|---|---|
| 0.05 | 363.3 | 363.3 | 363.3 | 363.3 | 363.3 | 363.3 | 378.28 | 340.21 | 402.78 |
| 0.1 | 404.12 | 404.12 | 404.12 | 404.12 | 404.12 | 404.12 | 418.68 | 381.27 | 443.8 |
| 0.15 | 441.38 | 441.38 | 441.38 | 441.38 | 441.38 | 441.38 | 455.5 | 418.81 | 481.21 |
| 0.2 | 475.52 | 475.52 | 475.52 | 475.52 | 475.52 | 475.52 | 489.2 | 453.26 | 515.42 |
| 0.25 | 506.92 | 506.92 | 506.92 | 506.92 | 506.92 | 506.92 | 520.14 | 477.7 | 540.48 |
| 0.3 | 527.14 | 527.14 | 527.14 | 527.14 | 527.14 | 527.14 | 531.13 | 478.5 | 554.55 |
| 0.35 | 534.42 | 534.42 | 534.42 | 534.42 | 534.42 | 534.42 | 531.52 | 478.83 | 563.07 |
| 0.4 | 534.78 | 534.78 | 534.78 | 534.78 | 534.78 | 534.78 | 531.7 | 479 | 567.6 |
| 0.45 | 534.95 | 534.95 | 534.95 | 534.95 | 534.95 | 534.95 | 531.8 | 479.1 | 567.86 |
| 0.5 | 535.05 | 535.05 | 535.05 | 535.05 | 535.05 | 535.05 | 531.87 | 479.16 | 568.01 |
| 0.55 | 535.12 | 535.12 | 535.12 | 535.12 | 535.12 | 535.12 | 531.92 | 479.21 | 568.11 |
| 0.6 | 535.17 | 535.17 | 535.17 | 535.17 | 535.17 | 535.17 | 531.96 | 479.24 | 568.18 |
| 0.65 | 535.2 | 535.2 | 535.2 | 535.2 | 535.2 | 535.2 | 531.98 | 479.27 | 568.23 |
| 0.7 | 535.23 | 535.23 | 535.23 | 535.23 | 535.23 | 535.23 | 532 | 479.29 | 568.27 |
| 0.75 | 535.25 | 535.25 | 535.25 | 535.25 | 535.25 | 535.25 | 532.02 | 479.3 | 568.29 |
| 0.8 | 535.26 | 535.26 | 535.26 | 535.26 | 535.26 | 535.26 | 532.03 | 479.31 | 568.32 |

At 750 bars Crystal side stress (MPa)

| Friction coeff. | A1 | B1 | C1 | A2 | B2 | C2 | A3 | B3 | C3 |
|---|---|---|---|---|---|---|---|---|---|
| 0.05 | 648.37 | 644.29 | 632.65 | 627.51 | 610.03 | 695.38 | 668.24 | 624.57 | 694.46 |
| 0.1 | 670.56 | 665.68 | 654.59 | 650.51 | 632.64 | 684.22 | 689.73 | 646.85 | 721.88 |
| 0.15 | 690.77 | 685.24 | 674.59 | 671.51 | 653.33 | 677.11 | 709.27 | 667.23 | 750.23 |
| 0.2 | 709.26 | 703.18 | 692.89 | 690.76 | 672.34 | 676.7 | 727.12 | 685.92 | 777.68 |
| 0.25 | 726.24 | 719.7 | 698.22 | 707.99 | 688.08 | 676.01 | 743.48 | 699.19 | 804.19 |
| 0.3 | 737.16 | 729.52 | 698.31 | 715.95 | 690.18 | 726.88 | 749.28 | 699.61 | 821.88 |
| 0.35 | 741.08 | 732.21 | 698.33 | 716.63 | 690.38 | 761.72 | 749.47 | 728.71 | 830.96 |
| 0.4 | 741.27 | 732.45 | 698.34 | 716.75 | 694.48 | 779.79 | 749.57 | 749.08 | 839.38 |
| 0.45 | 741.36 | 732.59 | 698.35 | 716.81 | 697.9 | 783.85 | 749.62 | 764.18 | 829.95 |
| 0.5 | 741.41 | 732.69 | 698.35 | 716.84 | 699.51 | 782.11 | 749.65 | 772.9 | 822.6 |
| 0.55 | 741.45 | 732.75 | 698.36 | 716.87 | 700.47 | 778.8 | 752.19 | 777.75 | 817.27 |
| 0.6 | 741.47 | 732.8 | 698.36 | 716.89 | 700.52 | 775.39 | 754.2 | 779.93 | 813.68 |
| 0.65 | 741.49 | 732.83 | 698.36 | 716.9 | 699.86 | 772.32 | 755.49 | 779.83 | 812.49 |
| 0.7 | 741.5 | 732.86 | 698.36 | 716.91 | 698.75 | 769.77 | 756.35 | 779.06 | 811.58 |
| 0.75 | 741.51 | 732.88 | 698.36 | 716.92 | 697.61 | 767.72 | 756.7 | 777.99 | 810.92 |
| 0.8 | 741.52 | 732.89 | 698.36 | 716.93 | 696.26 | 766.23 | 757.18 | 776.92 | 810.37 |

At 750 bars Middle side stress (MPa)

| Friction coeff. | A1 | B1 | C1 | A2 | B2 | C2 | A3 | B3 | C3 |
|---|---|---|---|---|---|---|---|---|---|
| 0.05 | 630.76 | 620.86 | 535.51 | 604.01 | 569.7 | 658.03 | 670.34 | 618.14 | 626.32 |
| 0.1 | 605.12 | 592.49 | 528.07 | 580.97 | 551.78 | 644 | 642.14 | 597.87 | 592.41 |
| 0.15 | 584.18 | 570.31 | 537.11 | 563.02 | 539.43 | 638.08 | 648.13 | 588.95 | 602.99 |
| 0.2 | 568.94 | 554.78 | 575.64 | 550.73 | 531.49 | 678.17 | 699.66 | 643.72 | 645.77 |
| 0.25 | 588.2 | 544.46 | 633.95 | 574.71 | 555.83 | 746.82 | 760.71 | 708.8 | 719.71 |
| 0.3 | 619.24 | 542.71 | 695.57 | 601.11 | 611.52 | 823.63 | 826.42 | 777.42 | 775.26 |
| 0.35 | 625.92 | 559.55 | 753.22 | 610.01 | 662.28 | 882.07 | 857.64 | 837.88 | 802.74 |
| 0.4 | 629.66 | 567.55 | 807.87 | 616.61 | 692.65 | 921.71 | 880.1 | 867.09 | 815.64 |
| 0.45 | 636.2 | 570.34 | 859.79 | 623.03 | 689.24 | 950.98 | 901.01 | 883.75 | 804.36 |
| 0.5 | 650.02 | 571.6 | 909.07 | 631.42 | 684.09 | 973.54 | 921.16 | 898.76 | 781.17 |
| 0.55 | 663.57 | 573.41 | 955.79 | 645.38 | 686.72 | 993.07 | 940.97 | 913.31 | 767.43 |
| 0.6 | 676.94 | 579.95 | 999.7 | 658.66 | 708.88 | 1008.4 | 960.64 | 927.99 | 760.48 |
| 0.65 | 689.5 | 577.08 | 1040.3 | 670.24 | 723.59 | 1020.1 | 979.43 | 942.44 | 755.43 |
| 0.7 | 701.66 | 575.11 | 1077.5 | 681.64 | 731.59 | 1034.1 | 997.33 | 956.99 | 751.76 |

-continued

| | | | | | | | | | |
|---|---|---|---|---|---|---|---|---|---|
| 0.75 | 711.96 | 578.64 | 1109.6 | 691.71 | 737.14 | 1049.1 | 1013.6 | 971.33 | 749.34 |
| 0.8 | 722.1 | 580.38 | 1141.6 | 700.6 | 739.03 | 1058.3 | 1029.5 | 984.67 | 755.08 |

A1: crystal radius
A2: crystal radius +0.5°
A3: crystal radius −0.5°
B1: middle radius
B2: middle radius +0.5°
B3: middle radius −0.5°
C1: cone on cone
C2: cone on cone +0.5°
C3: cone on cone −0.5°

It is determined above by the tables the stress calculations depending on whether the crystal 3 has a conical bearing against the middle 2 which also has a conical bearing, or with a curvature at first radius R1 on the crystal 3 side or at complementary first radius R1' on the middle 2 side and this depending on the friction coefficient as indicated above. In each case, an attempt is made to minimise the stress, which must ideally remain below 380 MPa for the pull of the crystal 3 and below 560 MPa for a steel type with a high elastic limit of the middle 2.

It is also taken into account in the tables above −0.5° of difference of side between the crystal 3 and the middle 2 (with bearing on the outside of the cone in top portion) or +0.5° (bearing on the inside of the cone in bottom portion). It can be seen in this case that regarding the tensile stress of the crystal, the conical bearing is good in the ideal case but poses problems when there is an offset bearing on the outside, whereas regarding the stress of the middle, this poses problems in all cases.

Radiation on the middle 2 side is what functions the best but radiation on the crystal 3 is simpler, and also makes it possible to absorb the effect of the tolerances.

In the following three tables shown below, the lag error is increased. Thus, the error on the angle of the crystal 3 is raised to −3°, which makes it possible to show that in all cases it is the conical bearing that degrades the conditions the most.

| At 750 bars Tensile stress, centre (MPa) | | | | | | |
|---|---|---|---|---|---|---|
| Friction coeff. | A1 | B1 | C1 | A2 | B2 | C2 |
| 0.05 | 363.3 | 358.48 | 355.31 | 508.7 | 464.09 | 586.1 |
| 0.1 | 404.12 | 398.7 | 396.35 | 554.01 | 498.53 | 630.71 |
| 0.15 | 441.38 | 435.47 | 433.81 | 601.22 | 530.22 | 671.27 |
| 0.2 | 475.52 | 469.2 | 468.14 | 642.9 | 559.59 | 708.85 |
| 0.25 | 506.92 | 500.25 | 478.19 | 678.81 | 586.48 | 743.16 |
| 0.3 | 527.14 | 518.7 | 478.38 | 709.99 | 607.43 | 775.79 |
| 0.35 | 534.42 | 523.77 | 478.45 | 744.78 | 610.53 | 804.58 |
| 0.4 | 534.78 | 524.24 | 478.49 | 774.445 | 612.6 | 830.72 |
| 0.45 | 534.95 | 524.52 | 478.51 | 802.38 | 613.61 | 857.03 |
| 0.5 | 535.05 | 524.7 | 478.53 | 827.26 | 613.93 | 880.31 |
| 0.55 | 535.12 | 524.83 | 478.54 | 849.42 | 614.11 | 902.87 |
| 0.6 | 535.17 | 524.93 | 478.55 | 871.795 | 614.23 | 923.52 |
| 0.65 | 535.2 | 525 | 478.56 | 894.48 | 614.31 | 942.38 |
| 0.7 | 535.23 | 525.05 | 478.56 | 914.37 | 614.38 | 960.02 |
| 0.75 | 535.25 | 525.09 | 478.56 | 929.495 | 614.43 | 977.32 |
| 0.8 | 535.26 | 525.12 | 478.57 | 934.265 | 614.47 | 993.74 |

| At 750 bars Crystal side stress (MPa) | | | | | | |
|---|---|---|---|---|---|---|
| Friction coeff. | A1 | B1 | C1 | A2 | B2 | C2 |
| 0.05 | 648.37 | 644.29 | 632.65 | 1004.6 | 772.44 | 1404.5 |
| 0.1 | 670.56 | 665.68 | 654.59 | 1025 | 802.88 | 1434.1 |
| 0.15 | 690.77 | 685.24 | 674.59 | 1047.6 | 847.04 | 1456.7 |
| 0.2 | 709.26 | 703.18 | 692.89 | 1070.5 | 866.34 | 1489.6 |

-continued

| | | | | | | |
|---|---|---|---|---|---|---|
| 0.25 | 726.24 | 719.7 | 698.22 | 1091.7 | 957.85 | 1514.5 |
| 0.3 | 737.16 | 729.52 | 698.31 | 1115 | 1038.4 | 1545.2 |
| 0.35 | 741.08 | 732.21 | 698.33 | 1138 | 1098.2 | 1568.7 |
| 0.4 | 741.27 | 732.45 | 698.34 | 1181.4 | 1162.5 | 1670.2 |
| 0.45 | 741.36 | 732.59 | 698.35 | 1260.4 | 1171.8 | 1793.3 |
| 0.5 | 741.41 | 732.69 | 698.35 | 1326.8 | 1150 | 1887.1 |
| 0.55 | 741.45 | 732.75 | 698.36 | 1393.3 | 1144.4 | 1995.1 |
| 0.6 | 741.47 | 732.8 | 698.36 | 1463.7 | 1179.3 | 2090.3 |
| 0.65 | 741.49 | 732.83 | 698.36 | 1527.2 | 1203.4 | 2176.3 |
| 0.7 | 741.5 | 732.86 | 698.36 | 1586.9 | 1215.4 | 2262 |
| 0.75 | 741.51 | 732.88 | 698.36 | 1645.7 | 1218.9 | 2353.4 |
| 0.8 | 741.52 | 732.89 | 698.36 | 1707.8 | 1218.9 | 2444.9 |

| At 750 bars Middle side stress (MPa) | | | | | | |
|---|---|---|---|---|---|---|
| Friction coeff. | A1 | B1 | C1 | A2 | B2 | C2 |
| 0.05 | 630.76 | 620.86 | 535.51 | 1049 | 948.82 | 1442.2 |
| 0.11 | 605.12 | 592.49 | 528.07 | 995.38 | 943.93 | 1389.8 |
| 0.15 | 584.18 | 570.31 | 537.11 | 959.94 | 987.38 | 1353.5 |
| 0.2 | 568.94 | 554.78 | 575.64 | 959.76 | 1026.6 | 1450.8 |
| 0.25 | 588.2 | 544.46 | 633.95 | 995.51 | 1070.5 | 1493.2 |
| 0.3 | 619.24 | 542.71 | 695.57 | 1040.5 | 1182.7 | 1544.5 |
| 0.35 | 625.92 | 559.55 | 753.22 | 1097.3 | 1297.2 | 1619.9 |
| 0.4 | 629.66 | 567.55 | 807.87 | 1149 | 1405.4 | 1699.1 |
| 0.45 | 636.2 | 570.34 | 859.79 | 1201.5 | 1509.6 | 1882.2 |
| 0.5 | 650.02 | 571.6 | 909.07 | 1257.6 | 1611.9 | 1963.8 |
| 0.55 | 663.57 | 573.41 | 955.79 | 1316.3 | 1710.5 | 2030.3 |
| 0.6 | 676.94 | 579.95 | 999.7 | 1386 | 1805.3 | 2110.1 |
| 0.65 | 689.5 | 577.08 | 1040.3 | 1438.7 | 1896.6 | 2189.9 |
| 0.7 | 701.66 | 575.11 | 1077.5 | 1499.1 | 1984.1 | 2289.6 |
| 0.75 | 711.96 | 578.64 | 1109.6 | 1559.3 | 2067.9 | 2473.3 |
| 0.8 | 722.1 | 580.38 | 1141.6 | 1624.4 | 2148.5 | 2549 |

A1: crystal radius
A2: crystal radius −3°
B1: middle radius
B2: middle radius −3°
C1: cone on cone
C2: cone on cone −3°

Additionally, a comparison is shown below in the case of also using a gasket or a ring made of amorphous metal referred to as BMG between the surfaces 12 and 13, or in the case of the present invention without the gasket or the ring made of amorphous metal. It is also specified a type of material of the middle 2, whereas for the crystal 3, this concerns sapphire or a mineral glass. Firstly, the six tables presented below relate to tests for mounting the glass on the middle depending on the materials used indicated below and with or without intermediate gasket. In this first test, there is a comparison in the first three tables with or without BMG ring, for a conical bearing or for the second three tables for a slightly radiated crystal.

| At 750 bars Tensile stress, centre (MPa) | | | | | | | |
|---|---|---|---|---|---|---|---|
| Friction coeff. | M1 | M2 | M3 | M4 | M5 | M6 | M7 |
| 0.05 | 355.31 | 364.35 | 353.95 | 426.32 | 426.37 | 426.3 | 433.21 |
| 0.1 | 396.35 | 406.14 | 394.89 | 469.95 | 470.17 | 469.92 | 477.91 |
| 0.2 | 468.14 | 479.24 | 464.74 | 544.58 | 542.86 | 543.9 | 540.6 |
| 0.3 | 478.38 | 541.03 | 465.76 | 572.24 | 568.16 | 570.88 | 552.99 |
| 0.8 | 478.57 | 549.34 | 465.94 | 580.64 | 576.32 | 579.62 | 560.08 |

| At 750 bars Crystal contact compression (MPa) | | | | | | | |
|---|---|---|---|---|---|---|---|
| Friction coeff. | M1 | M2 | M3 | M4 | M5 | M6 | M7 |
| 0.05 | 632.65 | 642.25 | 631.2 | 637.72 | 637.79 | 637.7 | 688.99 |
| 0.1 | 654.59 | 665 | 653.03 | 663.48 | 663.8 | 663.44 | 733.16 |
| 0.2 | 692.89 | 704.72 | 690.21 | 707.63 | 707.86 | 707.18 | 812.66 |
| 0.3 | 698.31 | 738.23 | 690.7 | 724.14 | 724.96 | 723.2 | 792.33 |
| 0.8 | 698.36 | 742.67 | 690.75 | 730.11 | 731.21 | 729.31 | 805.75 |

| At 750 bars Middle contact compression (MPa) | | | | | | | |
|---|---|---|---|---|---|---|---|
| Friction coeff. | M1 | M2 | M3 | M4 | M5 | M6 | M7 |
| 0.05 | 535.51 | 438.24 | 556.46 | 572.92 | 583.58 | 570.77 | 585.41 |
| 0.1 | 528.07 | 419.42 | 550.63 | 556.68 | 570.24 | 553.73 | 572.05 |
| 0.2 | 575.64 | 422.62 | 613.79 | 532.06 | 550.93 | 528.01 | 554.3 |
| 0.3 | 695.57 | 481.72 | 744.55 | 521.91 | 543.09 | 517.52 | 547.75 |
| 0.8 | 1141.6 | 858.63 | 1214.8 | 740.69 | 607.45 | 783.18 | 809.88 |

| At 750 bars Tensile stress, centre (MPa) | | | | | | | |
|---|---|---|---|---|---|---|---|
| Friction coeff. | M1 | M2 | M3 | M4 | M5 | M6 | M7 |
| 0.05 | 363.3 | 364.85 | 363.26 | 434.88 | 433.63 | 434.96 | 434.04 |
| 0.1 | 404.12 | 405.99 | 404.04 | 476.28 | 476.32 | 476.1 | 475.67 |
| 0.2 | 475.52 | 478.05 | 475.39 | 533.56 | 545.84 | 530.66 | 539.08 |
| 0.3 | 527.14 | 539.01 | 521.17 | 548.28 | 560.28 | 544.89 | 548.02 |
| 0.8 | 535.26 | 577.24 | 526.5 | 555.28 | 563.39 | 552.5 | 549.69 |

| At 750 bars Crystal contact compression (MPa) | | | | | | | |
|---|---|---|---|---|---|---|---|
| Friction coeff. | M1 | M2 | M3 | M4 | M5 | M6 | M7 |
| 0.05 | 648.37 | 650.27 | 648.31 | 651.59 | 650.01 | 651.69 | 650.49 |
| 0.1 | 670.56 | 672.94 | 670.46 | 674.27 | 674.43 | 674.12 | 673.52 |
| 0.2 | 709.26 | 712.55 | 709.09 | 704.29 | 712.92 | 702.61 | 708.06 |
| 0.3 | 737.16 | 745.94 | 733.81 | 712.13 | 721.14 | 710.17 | 713.01 |
| 0.8 | 741.52 | 766.82 | 736.68 | 715.7 | 722.72 | 714.04 | 723.3 |

| At 750 bars Middle contact compression (MPa) | | | | | | | |
|---|---|---|---|---|---|---|---|
| Friction coeff. | M1 | M2 | M3 | M4 | M5 | M6 | M7 |
| 0.05 | 630.76 | 467.68 | 661.12 | 856.49 | 693.18 | 879.7 | 853.83 |
| 0.1 | 605.12 | 446.6 | 634.23 | 804.74 | 679.81 | 823.24 | 847.11 |
| 0.2 | 568.94 | 418.71 | 610.94 | 717.49 | 643.91 | 729.72 | 835.98 |
| 0.3 | 619.24 | 408.33 | 674.32 | 690.31 | 634.96 | 705.15 | 832.92 |
| 0.8 | 722.1 | 431.57 | 784.74 | 668.11 | 620.48 | 682.18 | 832.65 |

M1: steel without gasket
M2: gold without gasket
M3: ceramic without gasket
M4: steel - BMG
M5: gold - BMG
M6: ceramic - BMG
M7: gold - steel It can be observed that for the tensile stress at the centre of the crystal 3, what counts is at what point the crystal 3 is held. At low friction coefficient the direct bearing is better because there are fewer interfaces that can slide between them, and at high friction coefficient what counts is that the crystal 3 rests on a material with high modulus of elasticity (steel or ceramic rather than gold or BMG). It is probable that even for a radiated crystal 3 the friction coefficient is low enough for the direct bearing version to be better from this point of view. Regarding the middle 2, the BMG gasket on the other hand makes it possible to limit the high friction coefficient stresses for a cone-on-cone bearing, but it is in principle also more advantageous to have a radius on the crystal to have this result with a direct contact with the surface 12 of the middle, which is sought by the present invention.

It should also be noted that on the preceding tables, it would be possible to add a pressure limit particularly to indicate a maximum admissible and achievable pressure. It must stop when one of the three limits (crystal tensile stress max. 380 Mpa, crystal compression max. 2000 Mpa or middle compression max. of 500 Mpa to 1200 Mpa) is reached. But it is still observed that the most unfavourable case is that of the cone-on-cone direct contact. In addition, there is always an advantage with versions without gasket or BMG ring.

Figure 2A:
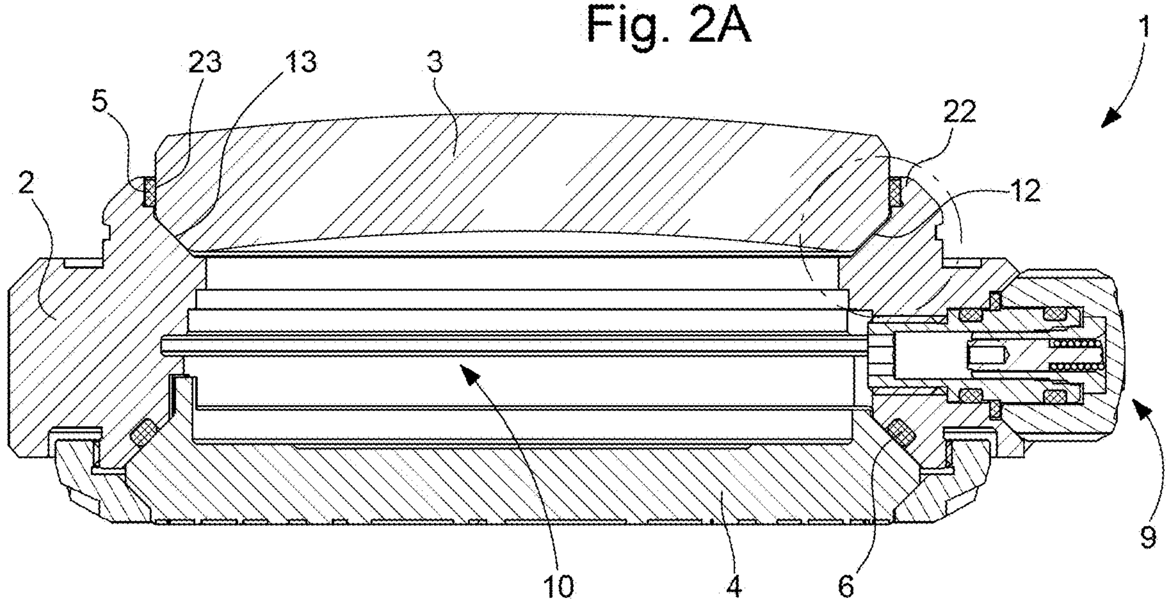
FIGS. 2*a* to 2*c* show in a simplified manner a cross-section of a second embodiment of a water-resistant watch case according to the invention, which is a variant of the first embodiment, and a partial detail section of the placement and of the fastening of the crystal to the middle according to the invention, and a partial detail section before fastening the crystal to the middle according to the invention.
Figure 2B:
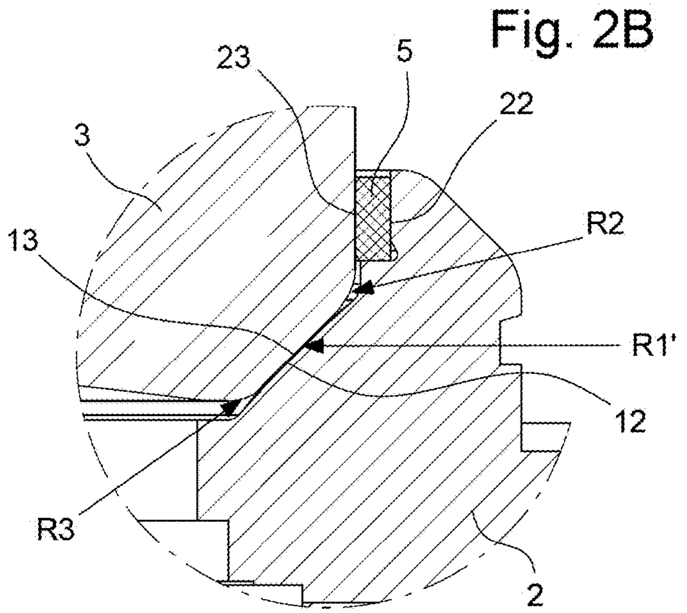
Figure 2C:
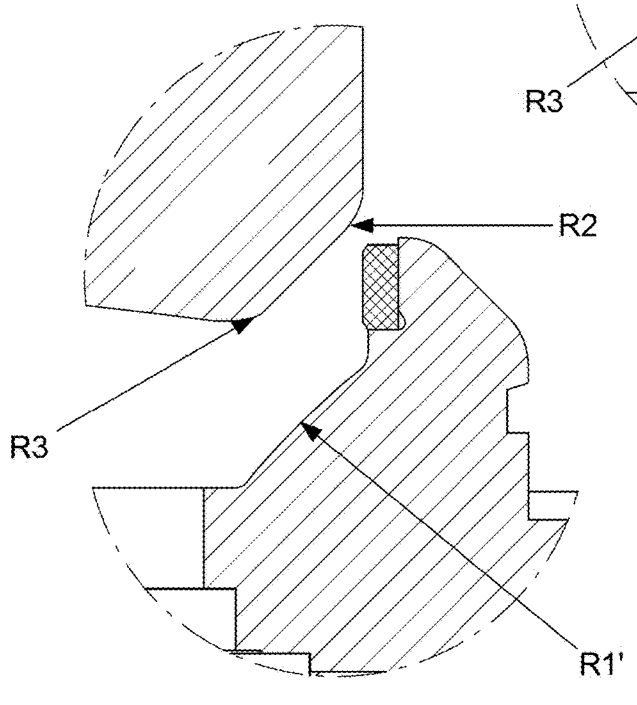

FIGS. 2*a* to 2*c* show a second embodiment of a water-resistant watch case 1. As this second embodiment resembles the first embodiment a lot, only the differences observed in relation to the first embodiment will be explained.

The main difference of the second embodiment is the fact that the domed contact surface portion is no longer on the annular peripheral surface 13 of the crystal 3, but on the annular inner surface 12 of the middle 2. However, the annular peripheral surface 13 of the crystal is this time of inclination with regular slope without variation of profile of the surface from the outside towards the inside of the watch case 1. The curvature of complementary first radius R1' may be of the same value as that of the curvature of first radius R1, but in an opposite configuration.

The curvatures of second radius R2 and third radius R3 remain produced on the annular peripheral surface 13 of the crystal 3 in the same places as for the first embodiment.

The curvature of the domed portion of radius R1 or R1' is disposed on one or other of the surfaces 12 and 13 by being oriented from bottom to top, that is to say in axial section with an arc of circle placed from bottom to top. The curvatures of radii R2 and R3 are also oriented from bottom to top.

Figure 3A:
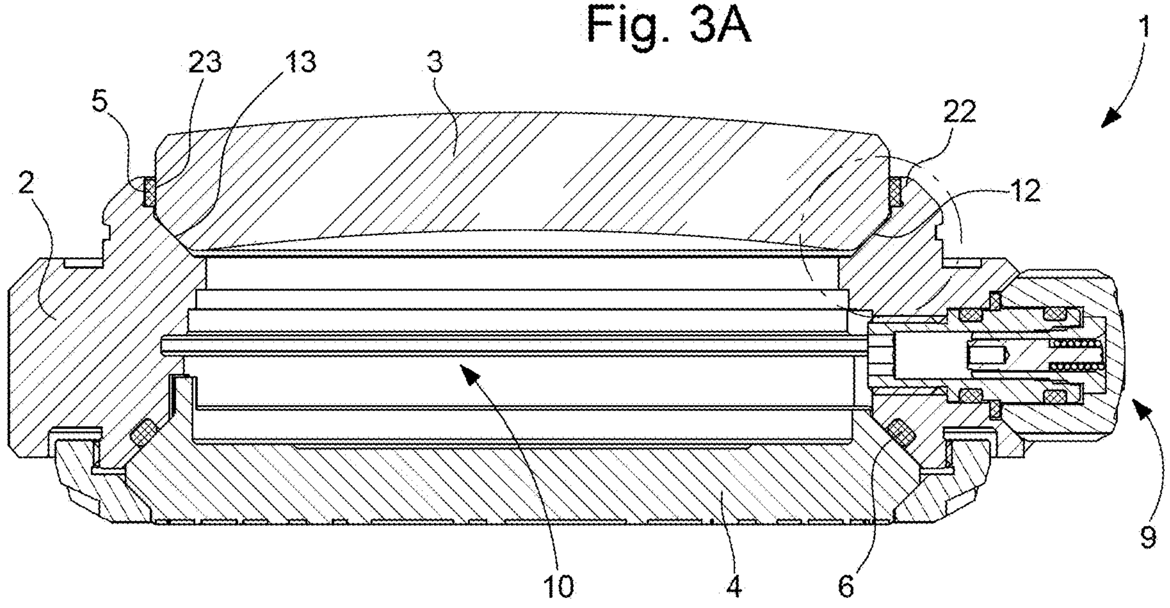
FIGS. 3*a* to 3*c* show in a simplified manner a cross-section of a third embodiment of a water-resistant watch case according to the invention, which is a combination of the first and second embodiments, and a partial detail section of the placement and of the fastening of the crystal to the middle according to the invention, and a partial detail section before fastening the crystal to the middle according to the invention.
Figure 3B:
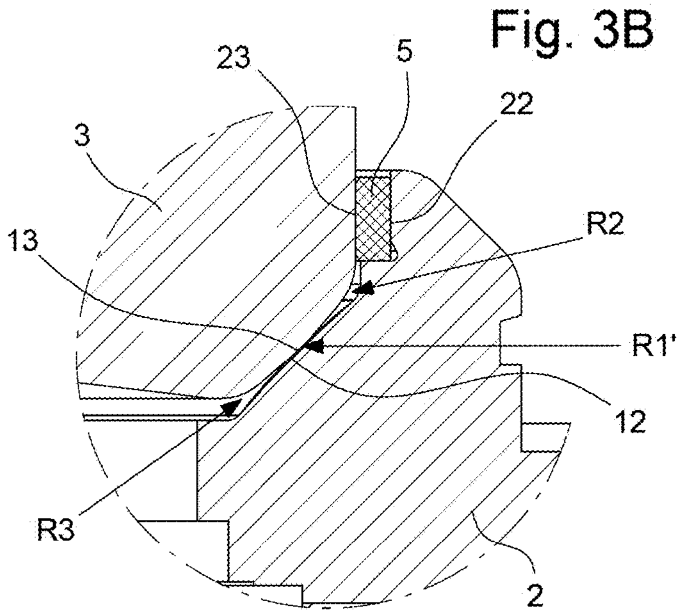
Figure 3C:
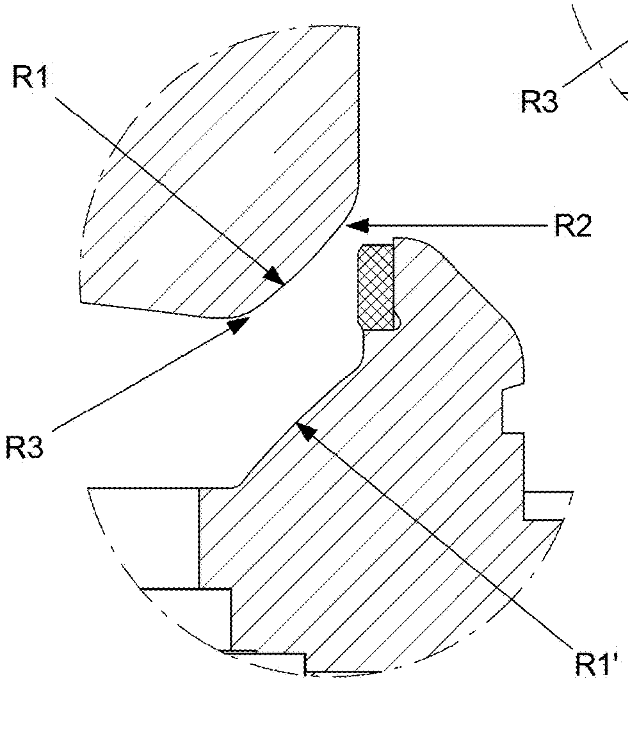
Figure 4A:
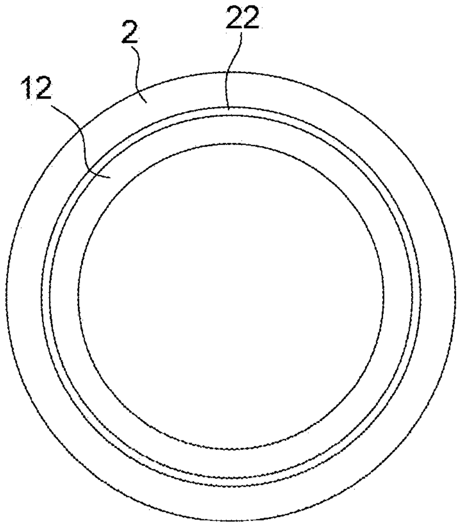
FIGS. 4*a* to 4*d* show in top view four shapes of middle of a watch case for receiving a circular or square or rectangular crystal in the periphery according to the invention.
Figure 4B:
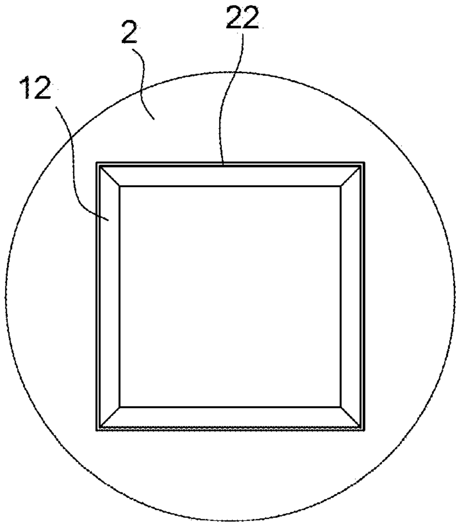
Figure 4C:
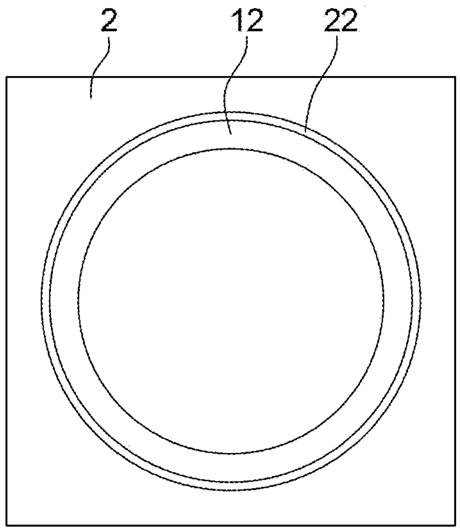
Figure 4D:
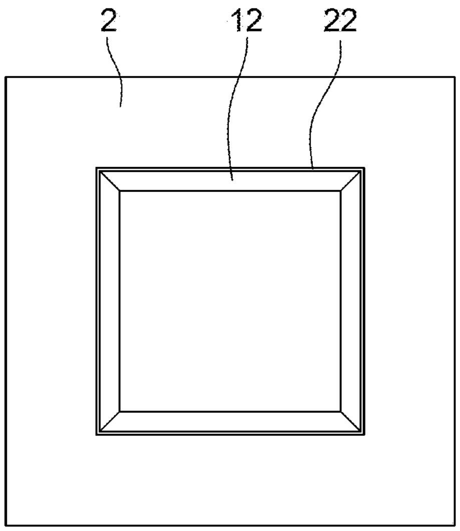

FIGS. 3*a* to 3*c* show a third embodiment of a water-resistant watch case 1. As this third embodiment resembles the first and second embodiments a lot, only the differences observed in relation to the first and second embodiments will be explained. Mainly, the third embodiment repeats the domed portions described above in the first and second embodiments.

The annular peripheral surface 13 of the crystal 3 comprises a domed contact surface portion with convex curvature of first radius R1 and the annular inner surface 12 also comprises a domed contact surface portion with convex curvature of complementary first radius R1'. The two curvatures are surfaces 12 and 13, which each indeed form domed portions of annular shape to come into contact against one another according to an annular contact line and in centred position of each surface 12 and 13. The two radii R1 and R1' are preferably similar but may also be slightly different from one another.

The annular peripheral surface 13 of the crystal 3 also comprises the curvatures of radii R2 and R3. As mentioned above, the curvatures of second radius R2 and third radius R3 remain produced on the annular peripheral surface 13 of the crystal 3 in the same places as for the first and second embodiments. It is also repeated the same values of radii R2 and R3.

In this embodiment, the fastening gasket 5 of annular shape may be made of polyurethane or even of cross-linked polyurethane. For a middle 2 of generally cylindrical shape, the fastening gasket 5 is cylindrical. Once the crystal 3 has been mounted on the middle 2, the fastening gasket 5 is fastened to an annular inner wall 22 of the middle 2 and an annular outer wall 23 of the crystal 3 above the annular peripheral surface 13.

By way of non-limiting example, the height of the fastening gasket 5 may be in the order of 2.5 mm. The thickness of the gasket may be in the order of 0.65 mm.

It should also be noted that with the fastening of the crystal 3 on the middle 2 of the alternative embodiments described above and with the contact between a surface with convex radius of curvature and a conical surface between the crystal 3 and the middle 2, good water-resistance and good stress distribution between the crystal 3 and the middle 2 is guaranteed. This is necessary given that the watch is a diving watch that must withstand high stresses due to the difference of pressure between the inside of the watch and the water pressure at large depths underwater. As the contact surface between the middle 2, and the crystal 3 is quite large with this conical shape, there is a better transmission of stresses over a larger surface, which is important to reduce the stress concentrations in the crystal and thus prevent it from breaking during a deep underwater dive. This also makes it possible to ensure the water-resistance of the watch case. With this arrangement, the water pressure on the watch case tends to close any interstices between the contact surfaces. In addition, this prevents the extrusion between the crystal and the inside of the middle.

Figure 5A:
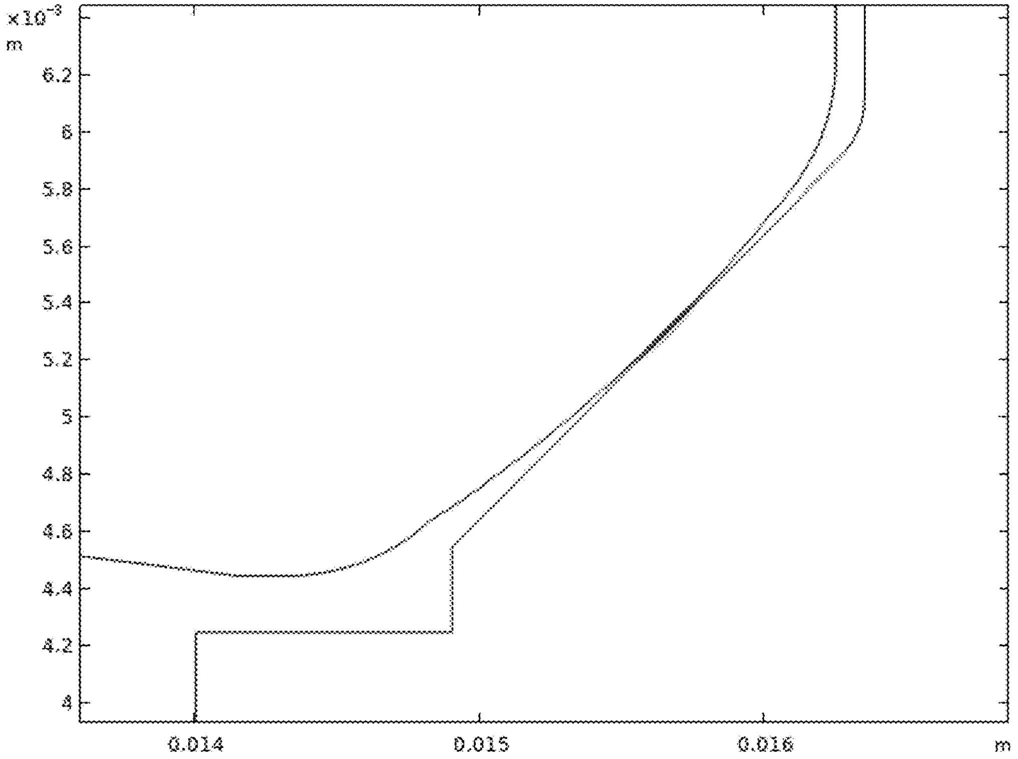
FIGS. 5*a* and 5*b* show the stress state of the mechanical contact of a domed contact surface portion particularly of the annular peripheral surface of the crystal on contact with the annular inner surface of the middle on the one hand at 1 bar of pressure of the crystal against the middle and on the other hand at 750 bars of pressure of the crystal against the middle according to the invention.
Figure 5B:
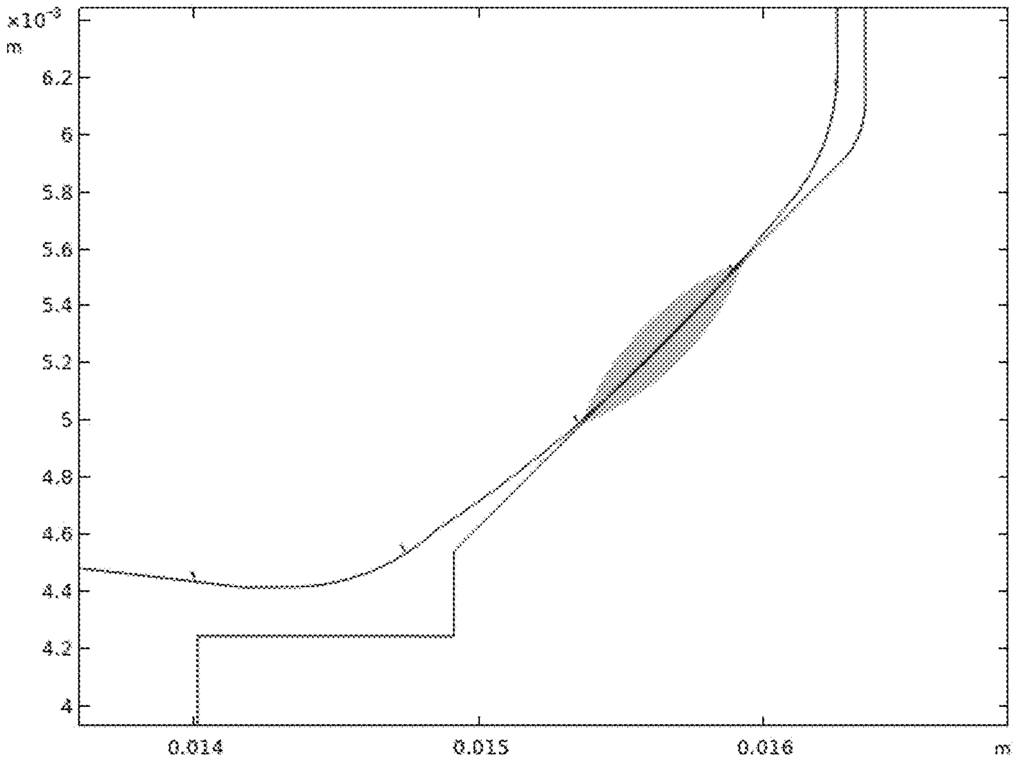

FIGS. 5A and 5B show the mechanical contact between the crystal and the middle by means of the domed contact surface portion produced on the crystal in this embodiment firstly at a pressure of 1 bar (FIG. 5A) and secondly at a pressure of 750 bars (FIG. 5B). The domed contact surface portion is on the annular peripheral surface of the crystal to come into contact on the annular inner surface of the middle.

These FIGS. 5A and 5B also show on the grey portion the contact pressure along the interface between crystal and middle. The thickness of this grey portion corresponds to the intensity of the contact pressure depending on the position. In this configuration with the contact of the domed portion of the annular peripheral surface of the crystal on the conical surface of the middle, it can be noted that the pressure is well centred on the contact area. In addition, with the larger contact surface at high pressure between the crystal and the middle, there is a better distribution of the contact forces and less risk of breakage of the crystal or of the middle which is advantageous.

Figure 6A:
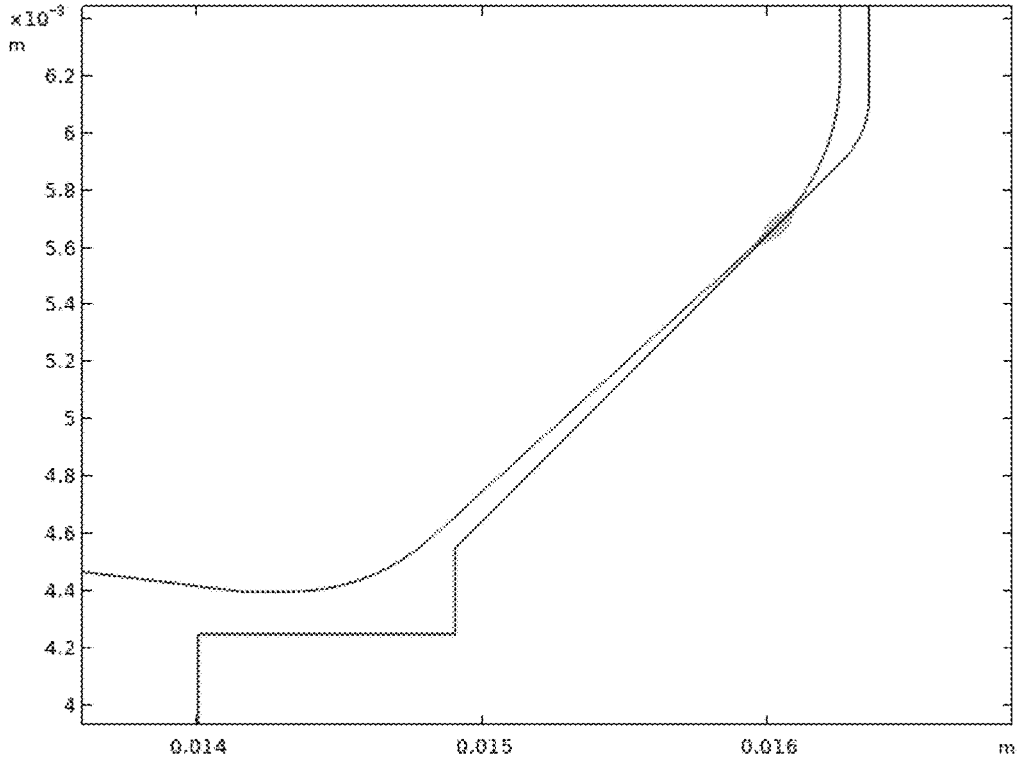
Fig. 6A Prior Art
FIGS. 6*a* and 6*b* show the stress state on mechanical contact of the conical annular peripheral surface of the crystal on contact with the annular inner surface of complementary conical shape of the middle on the one hand at 1 bar of pressure of the crystal against the middle and on the other hand at 750 bars of pressure of the crystal against the middle according to the prior art.
Figure 6B:
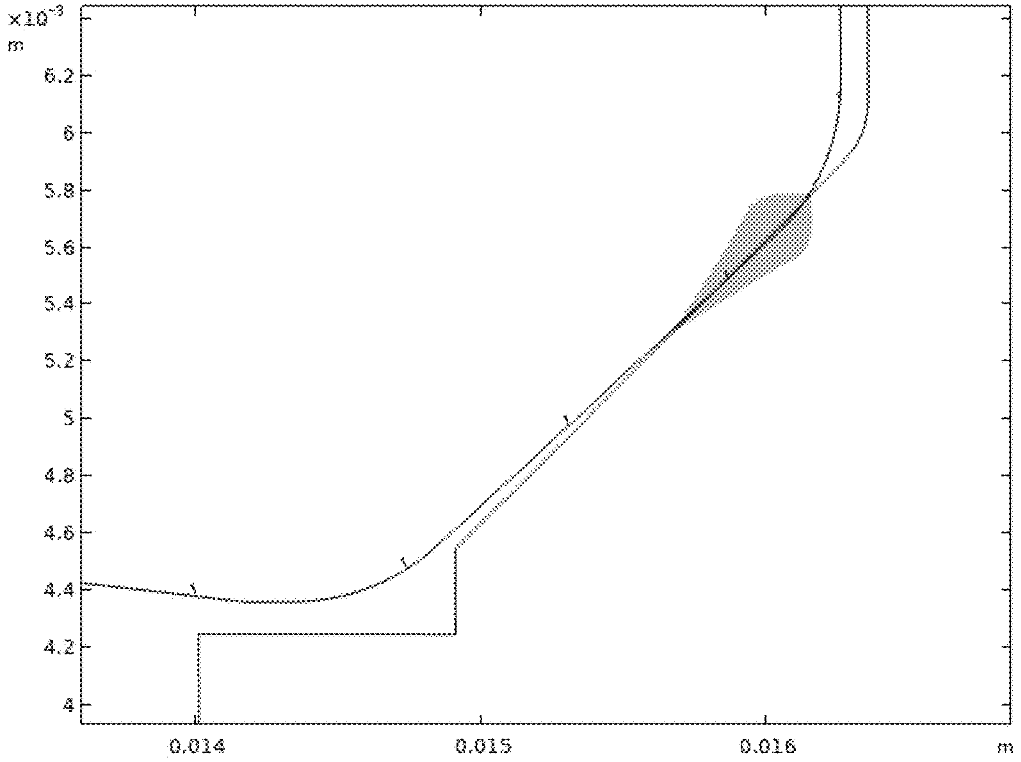
Fig. 6B Prior Art

FIGS. 6A and 6B show according to the prior art the mechanical contact between two conical surfaces of the crystal and of the middle firstly at a pressure of 1 bar (FIG. 6A) and secondly at a pressure of 750 bars (FIG. 6B).

These FIGS. 6A and 6B also show on the grey portion the contact pressure along the interface between crystal and middle. The thickness of this grey portion corresponds to the intensity of the contact pressure depending on the position. In this embodiment, with the conical bearing not only is the contact made on the outside but in addition the maximum of pressure is totally off-centred towards the outside of the initial contact area which constitutes a drawback.

From the description that has just been given, a plurality of alternative embodiments of the watch case may be designed by the person skilled in the art without departing from the scope of the invention defined by the claims. The watch case by its middle may have a general shape different from a cylinder.

What is claimed is:

1. A water-resistant watch case, for a diving watch, the case comprising at least one crystal mounted on a portion of a middle, a fastening gasket of the crystal being disposed between an annular inner wall of the middle and an annular outer wall of the crystal, wherein between the annular outer wall and the centre of the watch case, the crystal comprises an annular peripheral surface inclined at a defined angle smaller than 90° in relation to an axis perpendicular to a plane of the watch case and coming into direct contact against an annular inner surface of the middle, the annular inner surface being inclined at a same angle as the angle of inclination of the annular peripheral surface and disposed below the annular inner wall of the middle, and wherein the annular peripheral surface comprises a domed contact surface portion with a convex curvature having a first radius (R1) defining an annular contact line against the annular inner surface of the middle.

2. The watch case according to claim 1, wherein the annular inner surface of the middle is inclined with a regular slope without variation of the profile of the surface in the direction of the centre of the watch case.

3. The watch case according to claim 1, wherein the fastening gasket is made of polyurethane or of cross-linked polyurethane.

4. The watch case according to claim 1, wherein the middle is made of material with elastic limit higher than 500 MPa, and wherein the crystal is made of sapphire.

5. The watch case according to claim 4, wherein the middle is made of stainless steel with high nitrogen content or of grade 5 titanium (Ti6Al4V).

6. The watch case according to claim 1, wherein the first radius (R1) and/or the first complementary radius (R1') are chosen in the order of 10.7 mm±5 mm.

7. The watch case according to claim 1, wherein a top portion of the annular peripheral surface of the crystal comprises a curvature of a second radius (R2) in connection with the upper annular outer wall of the crystal, for which the second radius (R2) is smaller than the first radius (R1) of curvature of the domed portions, to facilitate the mounting of the crystal on the middle with the fastening gasket.

8. The watch case according to claim 7, wherein a bottom portion of the annular peripheral surface of the crystal comprises a curvature of a third radius (R3) to avoid having too sharp an edge, and wherein the third radius (R3) is smaller than or equal to the second radius (R2).

9. The watch case according to claim 7, wherein the second radius (R2) and/or the third radius (R3) are of value more than 10 times smaller than the first radius (R1).

10. The watch case according to claim 9, wherein the second radius (R2) and/or the third radius (R3) are chosen in the order of 0.75 mm+0.2 mm.

11. The watch case according to claim 1, wherein the watch case has a cylinder shape, in that the annular inner wall of the middle and the annular outer wall of the crystal are of cylindrical shape, and wherein the annular peripheral surface and the annular inner surface have a conical shape with domed contract surface portions on one of the surfaces or the two surfaces to have a direct contact on an annular contact line.

12. The watch case according to claim 1, wherein the middle of the watch case has an external cylindrical shape, and wherein the annular inner wall consists of four vertical flat walls provided and disposed one after the other in the shape of a ring, whereas the annular inner surface comprises four flat plates joined one after another and inclined in the direction of the centre of the watch case.

13. The watch case according to claim 1, wherein the middle of the watch case has an external parallelepiped shape with four sides, and wherein in the inside, the annular inner wall has a cylindrical shape, whereas the inclined annular inner surface has a conical shape.

14. The watch case according to claim 1, wherein the middle of the watch case has a parallelepiped shape with four sides on the outside, and wherein the annular inner wall consists of four vertical flat walls provided and disposed one after the other in the shape of a ring, whereas the annular inner surface comprises four flat plates joined one after another and inclined in the direction of the centre of the watch case.

15. A water-resistant watch case, for a diving watch, the case comprising at least one crystal mounted on a portion of a middle, a fastening gasket of the crystal being disposed between an annular inner wall of the middle and an annular outer wall of the crystal, wherein between the annular inner wall and the centre of the watch case, the middle comprises an annular inner surface inclined at a defined angle smaller than 90° in relation to an axis perpendicular to a plane of the watch case and coming into direct contact against an annular peripheral surface of the crystal, the annular peripheral surface being inclined at a same angle as the inclination of the annular inner surface and disposed below the annular outer wall of the crystal, and wherein the annular inner surface comprises a domed contact surface portion with a convex curvature having a first additional radius (R1') defining an annular contact line against the annular peripheral surface of the crystal.

16. The watch case according to claim 15, wherein the annular peripheral surface of the crystal is inclined with a regular slope without variation of the profile of the surface in the direction of the centre of the watch case.

17. The watch case according to claim 15, wherein the fastening gasket is made of polyurethane or of cross-linked polyurethane.

18. The watch case according to claim 15, wherein the first radius (R1) and/or the first complementary radius (R1') are chosen in the order of 10.7 mm±5 mm.

19. A water-resistant watch case, for a diving watch, the case comprising at least one crystal mounted on a portion of a middle, a fastening gasket of the crystal being disposed between an annular inner wall of the middle and an annular outer wall of the crystal, wherein between the annular outer wall and the centre of the watch case, the crystal comprises an annular peripheral surface inclined at a defined angle smaller than 90° in relation to an axis perpendicular to a plane of the watch case, in that between the annular inner wall and the centre of the watch case, the middle comprises an annular inner surface inclined at a same angle as the angle of inclination of the annular peripheral surface, and coming into direct contact against the annular peripheral surface of the crystal, and wherein the annular peripheral surface comprises a domed contact surface portion with a convex curvature having a first radius (R1), whereas the annular inner surface comprises a domed contact surface portion with a convex curvature of a first complementary radius (R1') defining an annular contact line against the annular peripheral surface of the crystal.

20. The watch case according to claim 19, wherein the fastening gasket is made of polyurethane or of cross-linked polyurethane.

21. The watch case according to claim 19, wherein the first radius (R1) and/or the first complementary radius (R1') are chosen in the order of 10.7 mm±5 mm.

* * * * *